United States Patent [19]

Ohms et al.

[11] 3,948,049

[45] Apr. 6, 1976

[54] DUAL MOTOR HYDROSTATIC DRIVE SYSTEM

[75] Inventors: Edward J. Ohms, Decatur; Wayne A. Peterson, Joliet, both of Ill.

[73] Assignee: Caterpillar Tractor Co., Peoria, Ill.

[22] Filed: May 1, 1975

[21] Appl. No.: 573,649

[52] U.S. Cl. .................. 60/426; 60/428; 60/486
[51] Int. Cl.² .................. F15B 13/09; F15B 18/00
[58] Field of Search ............ 60/420, 421, 425, 426, 60/428, 430, 486

[56] References Cited
UNITED STATES PATENTS

| | | | |
|---|---|---|---|
| 2,465,485 | 3/1949 | Robinson | 60/421 |
| 3,443,379 | 5/1969 | Weisenbach | 60/426 |
| 3,576,104 | 4/1971 | Kokaly et al. | 60/429 |
| 3,576,106 | 4/1971 | Nowicki | 60/426 |
| 3,623,320 | 11/1971 | Moore | 60/486 |

Primary Examiner—Edgar W. Geoghegan
Attorney, Agent, or Firm—John W. Grant

[57] ABSTRACT

A pair of hydraulic motors are operatively drivingly connected to a common rotatable member and are employed for transmitting power thereto from a pair of prime movers. A first hydraulic circuit communicates with one of the hydraulic motors and includes a pump driven by one of the prime movers while a second hydraulic circuit communicates with the other of the hydraulic motors and includes a fixed displacement pump and a variable displacement pump driven by the other prime mover. A device associated with the variable displacement pump is responsive to fluid pressures in the first and second hydraulic circuits for automatically varying the output displacement of the variable displacement pump so that a predetermined relationship is maintained between the fluid pressures in the first and second hydraulic circuit.

13 Claims, 1 Drawing Figure

U.S. Patent  April 6, 1976  3,948,049
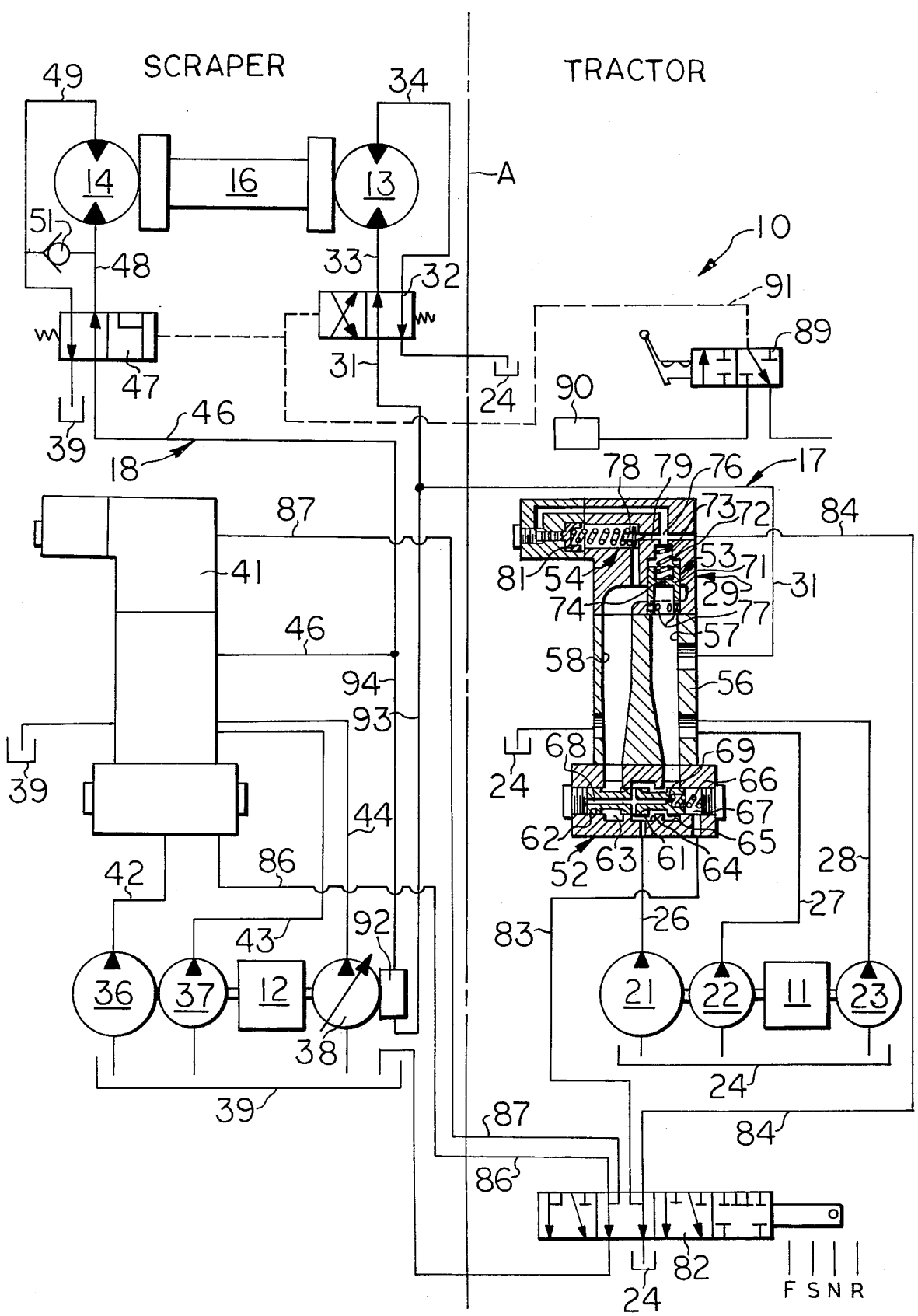

DUAL MOTOR HYDROSTATIC DRIVE SYSTEM

BACKGROUND OF THE INVENTION

Many elevator-type tractor-scrapers have an engine located on the tractor portion and another engine located on the scraper portion with power to drive the wheels and elevator taken either individually from separate engines or from a combination of both engines. Typically, the elevator is driven by one or more hydraulic motors which receive fluid from an engine driven pump or pumps. One of the difficulties encountered with such elevating scrapers is that of providing proper power balance or power utilization during loading while providing good mobility and gradability. To achieve adequate mobility and gradibility, a twin engine tractor-scraper should have between 60–40 and 50—50 front-to-rear engine power distribution. However, in certain situations during loading the power demand by the elevator may reach 60 to 70 percent of the total engine power. Thus, it is evident that minimum acceptable elevator power can equal or exceed the available power from a single engine and it is thereby desirable that the elevator be driven by power drawn equally from both engines. However, driving the elevator by power drawn from both engines creates a problem of obtaining equal pump outputs since several factors influence the output of the pumps including differences in the speeds of the engines and leakage of the pumps and motors.

One solution to this problem is taught by the U.S. Pat. No. 3,443,379 wherein the elevator is driven by a pair of hydraulic motors which individually receive fluid from a pair of variable displacement pumps each of which is driven by a separate engine. The displacement of one of the variable displacement pumps is controlled automatically in response to fluid pressure in the conduits connecting the pumps with the motors so that its output displacement matches that of the other variable displacement pump. However, a variable displacement pump and its attendent controls cost 2 to 3 times that of an equivalent fixed displacement pump arrangement and adds significantly to the total cost of the mechanism. The cost differential between these two types of pumps is even more pronounced on large mechanisms where a relatively large pump or a plurality of pumps are required to provide the necessary flow.

OBJECTS OF THE INVENTION

Accordingly, an object of this invention is to provide an improved dual motor hydrostatic drive system which transmits power from a pair of prime movers to a common driven rotatable member.

Another object of this invention is to provide such an improved dual motor hydrostatic drive system which automatically varies the fluid flow delivered to one of a pair of hydraulic motors for maintaining substantially equal fluid pressures at both the hydraulic motors.

Another object of this invention is to provide an improved dual motor hydrostatic drive system of the character described which automatically varies the displacement of a variable displacement pump to compensate for differences in the speeds of the engines driving the pumps.

Another object of this invention is to provide a dual motor hydrostatic drive system which is economical to manufacture.

Other objects and advantages of the present invention will become more readily apparent upon reference to the accompanying drawings and following description.

BRIEF DESCRIPTION OF THE DRAWINGS

The drawing is a schematic representation of a dual motor hydrostatic drive system embodying the principles of the present invention with parts shown in section for illustrative convenience.

DESCRIPTION OF THE PREFERRED EMBODIMENT

Referring now to the drawing, a dual motor hydrostatic drive system embodying the principles of the present invention is generally indicated by the reference numeral 10 in association with an elevator-type tractor-scraper, not shown. For illustration purposes the elements shown on the left side of a reference line A are disposed on the scraper portion while the elements shown on the right side of the reference line are disposed on the tractor portion. The tractor-scraper includes a pair of engines or prime movers 11 and 12 disposed on the tractor and scraper portions, respectively, in the usual manner. A pair of hydraulic drive motors 13 and 14 are connected to the opposite ends of a driven rotatable shaft 16 with the motor 13 receiving fluid from a first hydraulic circuit 17 and the motor 14 receiving fluid from a second hydraulic circuit 18.

The first hydraulic circuit includes a plurality of fixed displacement pumps 21, 22 and 23 powdered by the prime mover 11 in the usual manner. The pumps draw fluid from a common tank 24 with the output of the pumps transmitted through a plurality of pump conduits 26, 27 and 28 to a speed control valve 29 which will hereinafter be described in greater detail. An outlet conduit 31 connects the speed control valve with an air actuated reversing valve 32 which communicates with the opposite sides of the motor 13 through a pair of conduits 33 and 34.

The second hydraulic circuit 18 includes a pair of fixed displacement pumps 36 and 37 and a variable displacement pump 38 driven by the prime mover 12. The pumps draw fluid from a tank 39 and deliver fluid to a speed control valve 41 through a plurality of pump conduits 42, 43 and 44. An outlet conduit 46 connects the speed control valve with a control valve 47 which is in turn connected to the opposite sides of the motor 14 through a pair of conduits 48 and 49. A check valve 51 interconnects the conduits 48 and 49 to allow free flow of fluid from conduit 49 to conduit 48. Preferably, the rated capacity of the pumps 36 and 37 should be substantially equal to the rated capacity of the pumps 21 and 22, respectively while the medium displacement of the variable displacement pump 38 is substantially equal to the rated capacity of the pump 23.

The speed control valves 29 and 41 are similar to the pilot valve assembly described in the Kokaly et al U.S. Pat. No. 3,576,104 assigned to the assignee of the present application. The speed control valves are identical in structure and function and therefore only the speed control valve 29 will be described in detail. The speed control valve 29 includes a pair of unloading valves 52 an 53 and a relief valve 54 integrally provided within a composite valve body 56. A passage 57 is formed in the body and is in continuous communication with the pump conduits 27 and 28 and the outlet conduit 31. A drain passage 58 formed in the body is connected to the tank 24.

The unloading valve 52 has a valve spool 61 reciprocably mounted within a bore 62 formed in the valve body 56. A plurality of axially spaced annular grooves 63, 64 and 65 are formed in the bore and communicate with the drain passage 58, pump conduit 26 and passage 57, respectively. A spring 66 is provided in a chamber 67 formed at the right end of the valve spool and resiliently biases the valve spool to the left. A passageway 68 is formed in the valve spool and communicates the groove 64 with the leftward end of the valve spool. The passageway communicates with the chamber 67 through an orifice 69. With the valve spool in the leftward position shown, communication is established between grooves 64 and 65 and communication between grooves 64 and 63 is blocked. When the valve spool is shifted to the right, communication between grooves 64 and 63 is established while communication between grooves 64 and 65 is blocked.

The unloading valve 53 includes a piston 71 reciprocably mounted within a bore 72 of the valve body 56 and is resiliently urged downwardly to the position shown by a spring 73. An orifice 74 is formed in the piston and communicates the passage 57 with a pilot flow passage 76 formed in the valve body. In the position shown, the piston blocks communication between passages 57 aand 58. Upward movement of the piston establishes communication between passages 57 and 58 through a plurality of radially outwardly extending ports 77 formed in the piston.

The relief valve 54 includes a poppet 78 urged into sealing engagement with a branch port 79 of the pilot flow passage 76 by a spring 81 to block communication between the pilot flow passage and the drain passage 58.

A four-position manually actuated control valve 82 is connected to the speed control valves 29 and 41 by two pair of pilot lines 83 and 84 and 86 and 87, respectively. The pilot lines 83 and 84 communicate with the chamber 67 and the pilot flow passage 76, respectively of the speed control valve 29 while the pilot lines 86 and 87 communicate with counterpart elements of the speed control valve 41. A manual air control valve 89 is operative to selectively direct pressurized air from an air source 90 through an air line 91 simultaneously to the valves 32 and 47. The valves 82 and 89 are preferably arranged so that the valve 82 cannot be shifted to the R or reverse position unless the air control valve 89 is shifted to direct air through the air line 91.

A differential pressure compensator control 92 is operatively connected to the variable displacement pump 38 for controlling its displacement. A pair of signal lines 93 and 94 connect the compensator control with the output conduits 31 and 46 of the first and second hydraulic control circuits 17 and 18, respectively. The differential pressure compensator control may be of any suitable construction which is responsive to differential in pressures between the signal lines with such a control being described in the Budzich U.S. Pat. No. 3,444,689.

OPERATION

While the operation of the present invention is believed clearly apparent from the foregoing description, further amplification will subsequently be made in the following brief summary of such operation. The function of the unloading valve 52 of the speed control valve 29 is to direct the output of the pump 21 either to the tank 24 or into the passage 57. By venting the pilot line 83 and the chamber 67 to the tank through the control valve 82, a differential pressure is established by the flow of fluid from the passageway 68 in the valve spool 61 through the orifice 69 into the chamber 67. This causes the valve spool to shift to the right resulting in the output of the pump 21 being directed into the drain passage 58 where it is dumped to the tank. By blocking the pilot line 83 the pressure differential across the orifice is eliminated and the spring 66 urges the valve spool to the position shown causing the output of the pump to be directed into the passage 57 and the conduit 31 for driving the motor 13.

The unloading valve 53 of the speed control valve 29 controls communication between passages 57 and 58 so that the output of the pumps 22 and 23 is either dumped to the tank 24 or is directed to the hydraulic motor 13. With pilot line 84 and the pilot flow passage 76 vented to the tank, differential pressure caused by flow of fluid from the passage 57 through the orifice 74 produces a resultant upward force upon the piston 71 so that the piston is shifted upwardly from its position shown. With the piston in its upward position, the ports 77 communicate the passage 57 with the drain passage 58 so that the output of the pumps 22 and 23 is dumped to the tank. By blocking the pilot line 84 from the tank, the pressure differential across the orifice is eliminated resulting in the spring 73 urging the piston downwardly blocking communication between passages 57 and 58. In this condition, the output of the pumps 22 and 23 is directed through conduit 31 to the motor 13.

It is to be understood that the speed control valve 41 controls the output of the pumps 36, 37 and 38 in the same manner by controlling fluid flow through the pilot lines 86 and 87.

With the control valve 82 in the neutral position shown, the pilot lines 83, 84, 86 and 87 are vented to their respective tanks 24 and 39. This establishes a first condition of the speed control valves 29 and 41 whereby the fluid output of all the pumps is returned to the tanks. Shifting the control valve 82 to the S or slow speed position vents the lines 83 and 86 to the tanks while blocking pilot lines 84 and 87 from the tanks. This establishes a second condition of the speed control valves whereby the output of pumps 21 and 36 is dumped to the tanks while the output of pumps 22 and 23 is directed to the motor 13 and the output of pumps 37 and 38 is directed to the motor 14 for driving the motors at a slow speed.

As the fluid pressure in the outlet conduits 31 and 46 increases and the motors 13 and 14 begin to drive the shaft 16, the fluid pressure in the outlet conduits is transmitted through the signal lines 93 and 94 to the opposite sides of the differential pressure compensator control 92. Should the fluid pressure in the outlet conduit 31 and signal line 93 be higher than the fluid pressure in the outlet conduit 46 and signal line 94, the differential in pressure causes the differential pressure compensator control to increase the displacement of the variable displacement pump 38 until the pressures in the outlet conduits become substantially equal. With the pressures in the outlet conduits substantially equal, the fluid flow to the motors is substantially equal and the motors are inherently driven at the same speed. Conversely, if the fluid pressure in the outlet conduit 46 and signal line 94 is greater than the fluid pressure in the outlet conduit 31 and signal line 93, the differential pressure compensator control will decrease the displacement of the variable displacement pump until the fluid pressures in the outlet conduits becomes substantially equal.

Shifting the control valve 82 to the F or fast speed position blocks communication between the pilot lines 83, 84, 86 and 87 from their respective tanks 24 and 39. This establishes a third condition of the speed control valves 29 and 41 whereby the total output of the pumps 21, 22 and 23 is directed through the conduit 31 to the motor 13 while the output of pumps 36, 37 and 38 is directed through the outlet conduit 46 to the motor 14 for driving the motor at a faster speed. As described above in relation to the second condition of the speed control valves, the differential pressure compensator control senses the fluid pressures in the conduits 31 and 46 and automatically varies the displacement of the variable displacement pump 38 to maintain substantially equal pressures in the outlet conduits.

To drive the shaft 16 in a reverse direction, the air control valve 89 is shifted to direct pressurized air through the air line 91 to shift the reversing valve 32 and the control valve 47. The control valve 82 is then shifted to the R or reverse position for venting the pilot lines 83, 86 and 87 to their respective tanks 24 and 39 while blocking communication between the pilot line 84 and the tank. This conditions the speed control valve 41 so that the output of pumps 36, 37 and 38 is dumped to the tank and conditions the speed control valve 29 so that only the output of pump 21 is dumped to the tank. The output of pumps 22 and 23 is directed through the outlet conduit 31, the reversing valve 32 and conduit 34 to the motor 13 to drive the motor in a reverse direction. With the control valve 47 in its shifted position, the conduits 48 and 49 are interconnected so that the fluid in motor 14 is recirculated therethrough permitting the motor 14 to freewheel.

The check valve 51 permits the fluid from motor 14 to recirculate therethrough in certain situatuions where the motor 13 is driven in a forward direction with only the prime mover 11 running.

In view of the foregoing, it is readily apparent that the structure of the present invention provides an improved dual motor hydrostatic drive system which transmits substantially equal amounts of power from a pair of prime movers to a common driven rotatable member. The system utilizes a plurality of fixed displacement pumps for driving one of the motors and a plurality of fixed displacement pumps and a variable displacement pump for driving the other motor. By utilizing a plurality of low cost fixed displacement pumps to provide the bulk of the fluid flow requirements and a relatively small variable displacement pump to equalize the fluid flows to the motors, the overall cost of the elevator drive system is minimized. A differential pressure compensator control is associated with the variable displacement pump and is responsive to fluid pressures directed to the hydraulic motors for varying the displacement of the variable displacement pump for maintaining substantially equal fluid pressures at and fluid flows to the motors.

While the invention has been described and shown with particular reference to the preferred embodiment, it will be apparent that variations might be possible that would fall within the scope of the present invention which is not intended to be limited except as defined in the following claims.

What is claimed is:

1. A dual motor hydrostatic drive system, for transmitting power from a pair of prime movers to a common rotatable member, comprising;
    a pair of hydraulic motors operatively drivingly connected to such rotatable member;
    a first hydraulic circuit in communication with one of the hydraulic motors including pump means driven by one of such prime movers;
    a second hydraulic circuit in communication with the other of said hydraulic motors including a fixed displacement pump and a variable displacement pump both driven by the other of such prime movers; and
    means responsive to fluid pressure in the first and second hydraulic circuits for automatically varying the output displacement of the variable displacement pump so that a predetermined relationship is maintained between the fluid pressures in the first and second hydraulic circuits.

2. The dual motor hydrostatic drive system of claim 1 wherein said pump means includes a pair of fixed displacement pumps.

3. The dual motor hydrostatic drive system of claim 2 wherein the first and second hydraulic circuits each includes a tank, a first conduit communicating the hydraulic pumps with the respective motor, a second conduit communicating the motor with the tank, and speed control means disposed between the pumps and the motor, said speed control means being selectively actuatable to a first condition for dumping the output of both pumps to the tank for stopping rotation of the motor, a second condition for dumping the output of one pump to the tank while directing the output of the other pump to the motor for causing slow speed rotation of the motor, and a third condition directing the output of both pumps to the motor for causing the motor to rotate at a fast speed.

4. The dual motor hydrostatic drive system of claim 3 including a manually actuated control valve actuatable to a first, second and third position for selectively establishing said first, second and third conditions respectively of the speed control means of both circuits simultaneously and to a fourth position for simultaneously establishing the first position of the speed control means of the second hydraulic circuit and the second condition of the speed control means of the first hydraulic circuit.

5. The dual motor hydrostatic drive system of claim 4 including a reversing valve disposed in the first and second conduits of one of said hydraulic circuits normally positioned for directing the output of the pumps to the motor in one direction and actuatable to a reverse position for directing the output of the pumps through the motor in the opposite direction for reversing the direction of rotation of the motor.

6. The dual motor hydrostatic drive system of claim 5 including a control valve disposed in the first and second conduits of the other of said hydraulic circuits normally positioned to direct the output of the pumps through the motor in one direction and actuatable to a second position interconnecting the first and second conduits permitting freewheeling of the motor.

7. The dual motor hydrostatic drive system of claim 6 including control means for actuating the reversing valve and the control valve simultaneously.

8. The dual motor hydrostatic drive system of claim 3 wherein the fixed displacement pump of the second hydraulic circuit matches one of the fixed displacement pumps of the first hydraulic circuit, and the median displacement of the variable displacement pump of the second hydraulic circuit is substantially equal to the displacement of the other fixed displacement pump of the first hydraulic circuit.

9. The dual motor hydrostatic drive system of claim 8 wherein the first hydraulic circuit includes another fixed displacement pump driven by said one prime mover and disposed in parallel with said other fixed displacement pump, and the second hydraulic circuit includes another fixed displacement pump driven by said other prime mover and disposed in parallel with the variable displacement pump.

10. A dual motor hydrostatic drive system, for transmitting power from a pair of prime movers to a common rotatable member, comprising;
a pair of hydraulic motors operatively drivingly connected to such rotatable member;
a first hydraulic circuit in communication with one of the hydraulic motors including a pair of fixed displacement pumps driven by one of the prime movers, and valve means selectively actuatable for simultaneously directing the output of both pumps to said one hydraulic motor;
a second hydraulic circuit in communication with the other of said hydraulic motors including a fixed displacement pump and a variable displacement pump both driven by the other prime mover, and valve means selectively actuatable for simultaneously directing the output of both pumps to said other hydraulic motor; and
means responsive to fluid pressures in the first and second hydraulic circuits for automatically varying the output displacement of the variable displacement pump so that a predetermined relationship is maintained between the fluid pressures in the first and second hydraulic circuits.

11. The dual motor hydrostatic drive system of claim 10 wherein the first and second hydraulic circuits each include a tank, a first conduit communicating the valve means with the respective motor, a second conduit communicating the motor with the tank, and including a reversing valve disposed in the first and second conduits of the first hydraulic circuit normally positioned for directing the output of the pumps through the motor in one direction for driving the motor in a forward direction and actuatable to a reverse position for directing the output of the pumps through the motor in the opposite direction for reversing the direction of rotation of the motor.

12. The dual motor hydrostatic drive system of claim 11 including a control valve disposed in the first and second conduits of the second hydraulic circuit normally positioned to direct the output of the pumps through the motor in one direction for driving the motor in a forward direction and actuatable to a second position interconnecting the first and second conduits permitting freewheeling of the motor.

13. The dual motor hydrostatic drive system of claim 12 including control means for actuating the reversing valve and the control valve simultaneously.

* * * * *